(12) United States Patent
Li et al.

(10) Patent No.: US 12,396,025 B2
(45) Date of Patent: Aug. 19, 2025

(54) METHOD AND APPARATUS FOR TRIGGERING A SIDELINK SCHEDULING REQUEST AND SYSTEM

(71) Applicant: FUJITSU LIMITED, Kawasaki (JP)

(72) Inventors: Guorong Li, Beijing (CN); Xin Wang, Beijing (CN); Lei Zhang, Beijing (CN)

(73) Assignee: FUJITSU LIMITED, Kawasaki (JP)

(*) Notice: Subject to any disclaimer, the term of this patent is extended or adjusted under 35 U.S.C. 154(b) by 511 days.

(21) Appl. No.: 17/555,596

(22) Filed: Dec. 20, 2021

(65) Prior Publication Data
US 2022/0116959 A1    Apr. 14, 2022

Related U.S. Application Data

(63) Continuation of application No. PCT/CN2019/099583, filed on Aug. 7, 2019.

(51) Int. Cl.
*H04W 72/12* (2023.01)
*H04W 72/52* (2023.01)
*H04W 72/566* (2023.01)

(52) U.S. Cl.
CPC ........ *H04W 72/569* (2023.01); *H04W 72/52* (2023.01)

(58) Field of Classification Search
CPC ... H04W 72/569; H04W 72/52; H04W 72/21; H04W 76/14
See application file for complete search history.

(56) References Cited

U.S. PATENT DOCUMENTS

| 10,721,787 B2* | 7/2020 | Chen ................ H04W 76/14 |
| 11,838,936 B2* | 12/2023 | Kung ................ H04W 72/54 |
| 2010/0098011 A1 | 4/2010 | Pelletier et al. |

(Continued)

FOREIGN PATENT DOCUMENTS

| CN | 102257869 A | 11/2011 |
| CN | 106031224 A | 10/2016 |
| CN | 109587770 A | 4/2019 |

OTHER PUBLICATIONS

First Notification of Office Action and Search Report issued by the China National Intellectual Property Administration for corresponding Chinese Patent Application No. 201980097415.6, mailed on Nov. 24, 2023, with an English translation.

(Continued)

*Primary Examiner* — Luat Phung
(74) *Attorney, Agent, or Firm* — Myers Wolin, LLC

(57) ABSTRACT

Triggering a sidelink scheduling request including: if at least one regular sidelink buffer status report (SL BSR) is triggered, a scheduling request (SR) is triggered when at least one of the following conditions is satisfied: a time from the regular SL BSR is triggered to an uplink resource available for carrying the regular SL BSR is greater than a latency requirement to which a sidelink logical channel corresponds; a time of the uplink resource available for carrying the regular SL BSR is greater than the latency requirement to which the sidelink logical channel corresponds; a latency requirement or value of a priority to which the sidelink logical channel corresponds is lower than a first threshold or the value of the priority is greater than the first threshold; and a next SR resource to which the sidelink logical channel corresponds is earlier than an uplink resource carrying the regular SL BSR.

6 Claims, 5 Drawing Sheets

(56) References Cited

U.S. PATENT DOCUMENTS

| | | | |
|---|---|---|---|
| 2016/0374110 A1 | 12/2016 | Lee et al. | |
| 2017/0093541 A1* | 3/2017 | Pan | H04W 72/23 |
| 2019/0053260 A1 | 2/2019 | Shaheen | |
| 2019/0182639 A1 | 6/2019 | Basu Mallick et al. | |
| 2019/0182896 A1 | 6/2019 | Shrestha et al. | |
| 2020/0229198 A1* | 7/2020 | Kung | H04W 72/54 |
| 2020/0267594 A1 | 8/2020 | Xu et al. | |
| 2020/0351855 A1* | 11/2020 | Kung | H04L 1/1887 |
| 2021/0006362 A1* | 1/2021 | Loehr | H04L 1/1819 |
| 2021/0274545 A1* | 9/2021 | Adjakple | H04W 28/0268 |
| 2022/0007390 A1* | 1/2022 | Basu Mallick | H04L 1/08 |

OTHER PUBLICATIONS

International Search Report and Written Opinion of the International Searching Authority issued by the China National Intellectual Property Administration for corresponding International Patent Application No. PCT/CN2019/099583, mailed on Apr. 23, 2020, with an English translation.

Huawei et al., "Further discussion on SR configuration and procedure for NR SL Mode-1", Agenda Item: 11.4.3, 3GPP TSG-RAN WG2 Meeting #106, R2-1907450, Reno, USA, May 13-17, 2019.

* cited by examiner

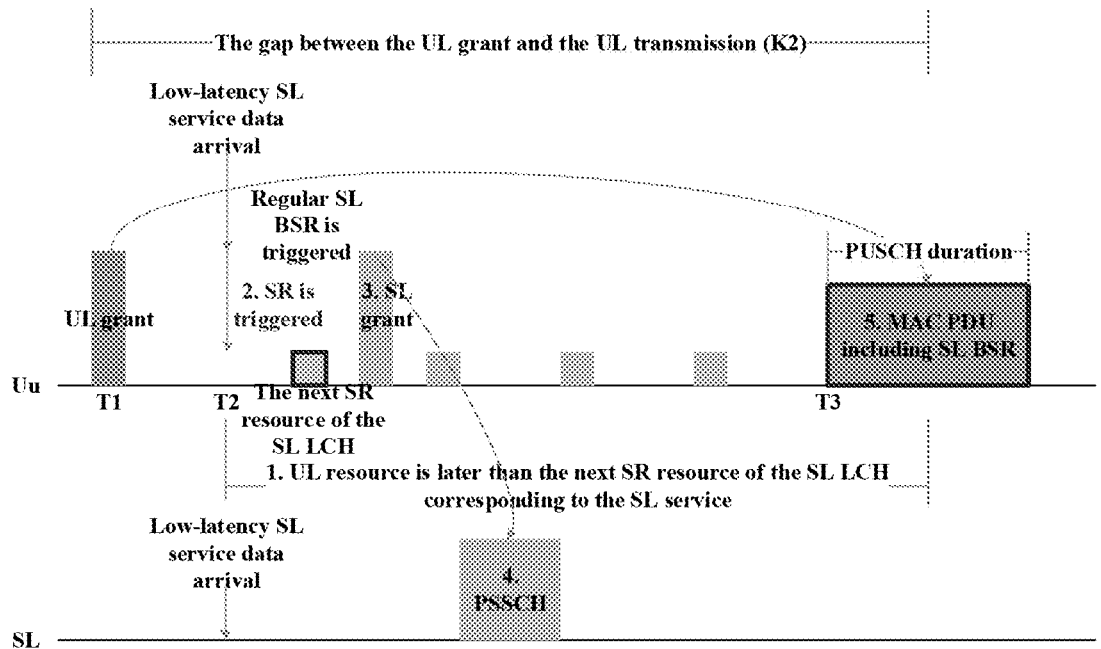

FIG. 5

601 a network device transmits first configuration information to a terminal equipment, the first configuration information including a latency-related parameter or logical channel priority to which a sidelink logical channel corresponds, and the terminal equipment triggering an SR when at least one regular sidelink buffer status report is triggered and at least one of conditions A, B, and C is satisfied

FIG. 6

METHOD AND APPARATUS FOR TRIGGERING A SIDELINK SCHEDULING REQUEST AND SYSTEM

CROSS-REFERENCE TO RELATED APPLICATION

This application is a continuation application of International Application PCT/CN2019/099583 filed on Aug. 7, 2019 and designated the U.S., the entire contents of which are incorporated herein by reference.

FIELD

This disclosure relates to the field of communications.

BACKGROUND

A sidelink (SL) communication mode refers to a communication mode in which data communication is performed with no need of a core network and a base station and is performed between two or more adjacent terminal equipments directly. The sidelink communication may be used for D2D (device to device) communication introduced in LTE (long term evolution), which is mainly for the field of public safety, and may be used for transmitting emergency service, such as early warning of disasters, such as earthquakes and fires. In addition, the sidelink communication may also be used for V2X (vehicle-to-everything) communication, that is, vehicle communication, such as autonomous driving, remote driving, unmanned driving, and fleets. Some V2X services have very strict requirements on latency, such as 3 ms.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that the transmission of latency-sensitive services on a sidelink may possibly not satisfy the latency requirements of the latency-sensitive services on the sidelink by using a current sidelink buffer status report (SL BSR) or a current scheduling request (SR) to request resources.

In order to solve at least one of the above problems or other similar problems, embodiments of this disclosure provide a method and apparatus for triggering a sidelink scheduling request and a system, in which an SR is transmitted by triggering the SR by a terminal equipment, so that a network device learns earlier that a terminal equipment has sidelink latency-sensitive service data to be transmitted.

According to a first aspect of the embodiments of this disclosure, there is provided a method for triggering a sidelink scheduling request, applicable to a terminal equipment, the method including:
if at least one regular sidelink buffer status report (SL BSR) is triggered, a scheduling request (SR) is triggered when at least one of the following conditions is satisfied that:
a time from the regular SL BSR is triggered to an uplink resource available for carrying the regular SL BSR is greater than a latency requirement to which a sidelink logical channel corresponds;
a time of the uplink resource available for carrying the SL BSR is greater than the latency requirement to which the sidelink logical channel corresponds;
a latency requirement or value of a priority to which the sidelink logical channel corresponds is lower than a first threshold (the smaller the value of a priority, the higher the priority) or the value of the priority is greater than the first threshold (the larger the value of a priority, the higher the priority); and
a next SR resource to which the sidelink logical channel corresponds is earlier than an uplink resource carrying the regular SL BSR; and
the scheduling request is transmitted to a network side.

According to a second aspect of the embodiments of this disclosure, there is provided a configuration method for a sidelink scheduling request, applicable to a network device, the method including:
a network device transmits first configuration information to a terminal equipment, the first configuration information including a latency-related parameter or logical channel priority to which a sidelink logical channel corresponds, and the terminal equipment triggering a scheduling request (SR) when at least one regular sidelink buffer status report (SL BSR) is triggered and at least one of the following conditions is satisfied that:
a time from the regular SL BSR is triggered to an uplink resource available for carrying the SL BSR is greater than a latency-related parameter to which a sidelink logical channel corresponds;
a time of the uplink resource available for carrying the regular SL BSR is greater than the latency-related parameter to which the sidelink logical channel corresponds; and
a latency-related parameter or a value of a logical channel priority to which the sidelink logical channel corresponds is lower than a first threshold (the smaller the value of a priority, the higher the priority) or the value of the priority is greater than the first threshold (the larger the value of a priority, the higher the priority).

According to a third aspect of the embodiments of this disclosure, there is provided a triggering apparatus for a sidelink scheduling request, configured in a terminal equipment, the apparatus including:
a triggering unit configured to, if at least one regular sidelink buffer status report (SL BSR) is triggered, trigger a scheduling request (SR) when at least one of the following conditions is satisfied that:
a time from the regular SL BSR is triggered to an uplink resource available for carrying the SL BSR is greater than a latency requirement to which a sidelink logical channel corresponds;
a time of the uplink resource available for carrying the regular SL BSR is greater than the latency requirement to which the sidelink logical channel corresponds;
a latency requirement or value of a priority to which the sidelink logical channel corresponds is lower than a first threshold (the smaller the value of a priority, the higher the priority) or the value of the priority is greater than the first threshold (the larger the value of a priority, the higher the priority); and
a next SR resource to which the sidelink logical channel corresponds is earlier than an uplink resource carrying the regular SL BSR; and
a transmitting unit configured to transmit the scheduling request to a network side.

According to a fourth aspect of the embodiments of this disclosure, there is provided a configuration apparatus for a sidelink scheduling request, configured in a network device, the apparatus including:

- a first transmitting unit configured to transmit first configuration information to a terminal equipment, the first configuration information including a latency-related parameter or logical channel priority to which a sidelink logical channel corresponds, and the terminal equipment triggering an SR when at least one regular sidelink buffer status report (SL BSR) is triggered and at least one of the following conditions is satisfied that:
- a time from the regular SL BSR is triggered to an uplink resource available for carrying the SL BSR is greater than a latency-related parameter to which a sidelink logical channel corresponds;
- a time of the uplink resource available for carrying the regular SL BSR is greater than the latency-related parameter to which the sidelink logical channel corresponds; and
- a latency-related parameter or a value of a logical channel priority to which the sidelink logical channel corresponds is lower than a first threshold (the smaller the value of a priority, the higher the priority) or the value of the priority is greater than the first threshold (the larger the value of a priority, the higher the priority).

According to a fifth aspect of the embodiments of this disclosure, there is provided a terminal equipment, including the apparatus as described in the third aspect.

According to a sixth aspect of the embodiments of this disclosure, there is provided a network device, including the apparatus as described in the fourth aspect.

According to a seventh aspect of the embodiments of this disclosure, there is provided a communication system, including the terminal equipment as described in the fifth aspect and the network device as described in the sixth aspect.

According to another aspect of the embodiments of this disclosure, there is provided a computer readable program, which, when executed in a terminal equipment, will cause a computer to carry out the method described in the first aspect in the terminal equipment.

According to a further aspect of the embodiments of this disclosure, there is provided a storage medium storing a computer readable program, which will cause a computer to carry out the method described in the first aspect in a terminal equipment.

According to yet another aspect of the embodiments of this disclosure, there is provided a computer readable program, which, when executed in a network device, will cause a computer to carry out the method described in the second aspect in the network device.

According to still another aspect of the embodiments of this disclosure, there is provided a storage medium storing a computer readable program, which will cause a computer to carry out the method described in the second aspect in a network device.

An advantage of the embodiments of this disclosure exists in that with the method, apparatus and system of the embodiments of this disclosure, triggering conditions of the SR are increased, so that the SR is triggered, thereby facilitating the network side to schedule SL resources as early as possible according to the received SR, and reducing transmission latency for latency-sensitive SL data.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiments.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings:

FIG. 5 is a schematic diagram of another scenario of triggering an SR according to the method of the embodiment of this disclosure;

FIG. 6 is a schematic diagram of the method of the second aspect of the embodiments of this disclosure;

DETAILED DESCRIPTION

Figure 1:
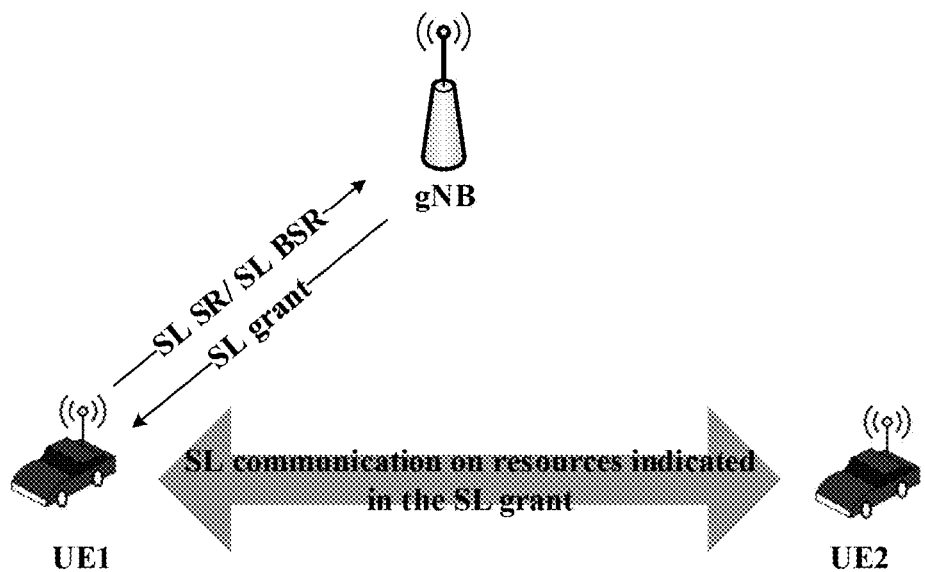
FIG. 1 is schematic diagram of a scenario of an embodiment of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any of the following communication standards: New Radio (NR), long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, 5G and 6G in the future, etc., and/or other communication protocols that are currently known or will be developed in the future.

In the embodiments of this disclosure, the term "network device", for example, refers to a device in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, depending on a context of the term.

In the embodiments of this disclosure, the term "user equipment (UE)" refers to, for example, an equipment accessing to a communication network and receiving network services via a network device, and may also be referred to as a "terminal equipment (TE)". The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Scenarios of the embodiments of this disclosure shall be described below by way of examples; however, this disclosure is not limited thereto.

FIG. 1 is schematic diagram of a scenario of an embodiment of this disclosure. As shown in FIG. 1, UE1 and UE2 perform sidelink data communication services on a sidelink. In a sidelink resource allocation mode (mode-1) where the sidelink resource allocation mode is scheduled by a network, UE1 transmits an SR (or called an SL SR) or an SL BSR to a gNB via a UL (uplink), the gNB transmits DCI (downlink control information) carrying an SL grant via a DL (downlink), and UE1 performs data transmission on the sidelink by using resources indicated by the SL grant.

It should be noted that for data transmission on the sidelink, the SL BSR may include a destination index, logical channel group (LCG) information and a buffer size to which the logical channel group correspond, and the SL BSR is transmitted by using an MAC CE (media access control control element). After receiving the MAC CE including the SL BSR, a base station may allocate resources on the SL to a transmitter end by transmitting the SL grant for SL data transmission.

When the SL BSR is triggered, when there exists no available uplink resource or when an available uplink resources is unable to accommodate the MAC CE including the SL BSR and its subheader, the SR will be triggered. Currently, in NR (new radio), separate SR configurations may be supported for a UL and an SL; in addition, different SR configurations may be performed for different SL logical channels, and one SL logical channel may correspond to 0 or 1 SR configuration. In this way, when the base station receives the SR, according to configuration of the SR, it may learn which logical channel on the SL has data to be transmitted, so as to allocate a corresponding SL grant for SL data transmission.

Figure 2:
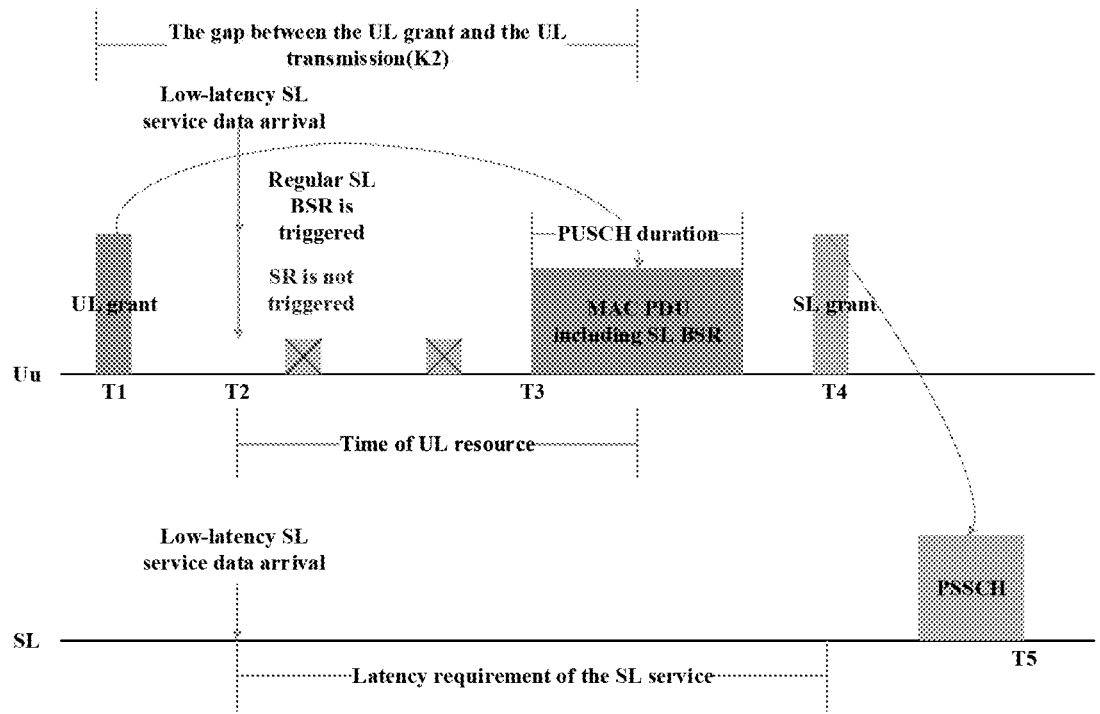
FIG. 2 is a schematic diagram of a data transmission process when a regular SL BSR is triggered.

FIG. 2 is a schematic diagram of a data transmission process when a regular SL BSR is triggered. As shown in FIG. 2, a UE has an available UL resource, such as a scheduled UL-SCH resource or a UL-SCH resource to which a configured uplink grant corresponds; however, an intention of the network to allocate the UL resource is for eMBB (enhanced mobile broadband) data transmission, hence, the UL resource arrives at a later time. Before arrival of the UL resource, the UE has service data arriving on the sidelink. This service may be a latency-sensitive service, such as a V2X service related to autonomous driving. The arrival of the V2X service triggers a regular SL BSR (regular sidelink BSR), which will be transmitted to the network side in the available UL resource. However, as the SL BSR is transmitted to the network side later, when the network side receives the SL BSR and then allocates an SL resource for data transmission of the latency-sensitive service on the sidelink, a latency requirement of the service may have been exceeded. Therefore, relying on the transmission of SL BSR may possibly not be able to meet a transmission latency requirement of a latency-sensitive service on the sidelink.

In addition, as a logical channel priority prioritization mapping restriction in the SL is different from a logical channel priority prioritization mapping restriction of the UL, for example, mapping between an SL logical channel and an SL subcarrier spacing is not supported, and the UL resource may not be used for transmitting SL services, a method for triggering an SR in current UL transmission is unable to be applicable to triggering of an SR in SL transmission.

In order to at least solve the problem that the SL BSR is transmitted later and latency requirements of latency-sensitive services are unable to be satisfied, this disclosure is proposed. Various embodiments of this disclosure shall be described below with reference to the accompanying drawings. These embodiments are exemplary only, and are not intended to limit to this disclosure.

Embodiment of the First Aspect

Figure 3:
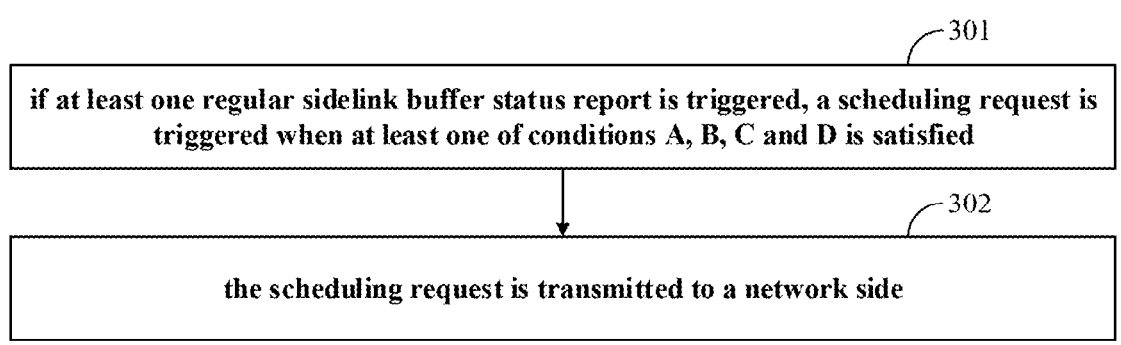
FIG. 3 is a schematic diagram of the method of the first aspect of the embodiments of this disclosure.

The embodiment of the first aspect of the disclosure provides a method for triggering a sidelink scheduling request, applicable to a terminal equipment. FIG. 3 is a schematic diagram of the method for triggering a sidelink scheduling request of this embodiment. Referring to FIG. 3, the method includes:

operation 301: if at least one regular sidelink buffer status report (SL BSR) is triggered, a scheduling request (SR) is triggered when at least one of the following conditions A, B, C and D is satisfied; and operation 302: the scheduling request is transmitted to a network side.

Condition A: a time from the regular SL BSR is triggered to an uplink resource available for carrying the regular SL BSR is greater than a latency requirement to which a sidelink logical channel corresponds.

Condition B: a time of the uplink resource available for carrying the regular SL BSR (such as PUSCH duration) is greater than the latency requirement to which the sidelink logical channel corresponds.

Condition C: a latency requirement or value of a priority to which the sidelink logical channel corresponds is lower than a first threshold (the smaller the value of a priority, the higher the priority) or the value of the priority is greater than the first threshold (the larger the value of a priority, the higher the priority).

Condition D: a next SR resource to which the sidelink logical channel corresponds is earlier than an uplink resource carrying the regular SL BSR.

In the embodiment of this disclosure, as the conditions for triggering the SR are added, the network side is facilitated to schedule SL resources as early as possible according to the received SR, and transmission latency for latency-sensitive SL data is reduced.

In at least one embodiment, the triggering of the at least one regular SL BSR may be that a regular SL BSR has been triggered (or has been triggered and has not been canceled), in which case when at least one of the above conditions A, B, C and D is satisfied, a SR is triggered.

In at least one embodiment, the triggering of the at least one regular SL BSR may be that more than one regular SL BSRs have been triggered (or have been triggered and have not been cancelled), in which case for a triggered regular SL BSR, when at least one of the above conditions A, B, C and D is satisfied, a SR is triggered.

In at least one embodiment, the triggering of the at least one regular SL BSR may be that more than one regular SL BSRs have been triggered (or have been triggered and have not been cancelled), in which case for a regular SL BSR triggered by a logical channel of a highest priority, or a logical channel of minimum required latency, or a logical channel having a value of a priority less than a threshold (referred to as a second threshold), or a logical channel having a latency requirement less than a threshold (referred to as a third threshold), in the logical channels triggering these regular SL BSRs, whether at least one of the above conditions A, B, C and D is satisfied is judged, and when at least one of the above conditions A, B, C and D is satisfied, an SR is triggered. The second threshold and the third threshold may be configured by the network, or may be preconfigured, or may be predefined, and that a value of a priority is less than a second threshold denotes that the priority is higher than a specific value.

In at least one embodiment, the sidelink logical channel is a sidelink logical channel triggering the SL BSR. However, this disclosure is not limited thereto. For example, the above sidelink logical channel may also be a sidelink logical channel having a priority higher than that of the sidelink logical channel triggering the above SL BSR and having data to be transmitted, or a sidelink logical channel having a latency requirement less than that of the sidelink logical channel triggering the above SL BSR and having data to be transmitted, or a sidelink logical channel having a value of priority or latency requirement less than a threshold (referred to as a fourth threshold) and having data to be transmitted, wherein, that a value of priority is less than a fourth threshold denotes that the priority is higher than a specific value; however, this disclosure is not limited thereto.

In the embodiment of this disclosure, in the above condition A, the time from the SL BSR is triggered to an uplink resource available for carrying the SL BSR may be a time from a moment when the SL BSR is triggered to a starting moment of the uplink resource available for carrying the SL BSR, or may also be a time from a moment when the SL BSR is triggered to an ending moment of the uplink resource available for carrying the SL BSR, i.e. a time including a UL resource, such as a PUSCH duration.

In the embodiment of this disclosure, in the above conditions A-C, the latency requirement to which the sidelink logical channel corresponds may be at least one of the following: a latency-related parameter; a packet delay budget; and other information related to the latency requirement.

In at least one embodiment, the above latency-related parameter may be a latency-related parameter configured by the network side for the above sidelink logical channel, or may be a latency-related parameter transmitted by a terminal equipment to another terminal equipment. In the embodiment of this disclosure, the network side may configure a corresponding latency-related parameter, such as T, for a sidelink logical channel, and the latency-related parameter T may be taken as a latency requirement to which the sidelink logical channel corresponds, and when the time from the regular SL BSR is triggered to the uplink resource available for carrying the regular SL BSR is greater than the latency-related parameter T, and/or a time of the uplink resource available for carrying the regular SL BSR is greater than the latency-related parameter T to which the sidelink logic channel corresponds, and/or the latency-related parameter T is lower than the first threshold, the SR is triggered. For example, the network device may transmit configuration information to the terminal equipment, the configuration information including the above latency-related parameter configured by it for the above sidelink logical channel. The configuration information may be included in an RRC message of a Uu interface, such as an RRC reconfiguration message or an RRC resume message, etc. For another example, if the above latency-related parameter is transmitted by a terminal equipment to another terminal equipment, the configuration information may be included in an RRC message transmitted on a PC5 interface or a sidelink, such as a PC5-RRC message related to access stratum configuration and/or capability information, and a mode of transmitting the configuration information and a mode of carrying the above latency-related parameter in the configuration information are not limited in this disclosure.

In at least one embodiment, the above packet delay budget may be one to which the above sidelink logical channel corresponds. For example, the packet delay budget may be a packet delay budget corresponding to a service quality identifier to which the sidelink logical channel corresponds, and the information related to the latency requirement may be a latency requirement to which a default priority level corresponds, the default priority level corresponding to a service quality identifier to which the sidelink logical channel corresponds. Here, the service quality identifier is, for example, a PQI (a PC5 5QI, a PC5 5G QoS identifier, PC5 5G service quality identifier). Here, the service quality identifier (such as POI) to which the sidelink logical channel corresponds may be a service quality identifier (such as a PQI) of a sidelink service flow (QoS flow) corresponding to a sidelink radio bearer to which the sidelink logical channel corresponds, may be a service quality identifier (such as PQI) to which a packet carried in the sidelink logical channel (such as a V2X packet) corresponds, or may also be a service quality identifier (PQI) to which a logical channel configured by the network or a pre-configured logical channel corresponds, and this disclosure is not limited thereto. Thus, a SR is triggered when the time from the regular SL BSR is triggered to the uplink resource available for carrying the regular SL BSR is greater than the latency requirement to which the packet delay budget or the default priority level corresponds, and/or the time of the uplink resource available for carrying the regular SL BSR is greater than the latency requirement corresponding to the packet delay budget or the default priority level to which the sidelink logical channel corresponds, and/or the latency requirement to which the packet delay budget or the default priority level corresponds is lower than the first threshold.

In the embodiment of this disclosure, the above latency-related parameters and the concept of the packet delay budget or default priority level may not be used, and the latency requirement of the sidelink logical channel may be directly used. For example, a SR is triggered when the time from the regular SL BSR is triggered to the uplink resource available for carrying the regular SL BSR is greater than the latency requirement, and/or the time of the uplink resource available for carrying the regular SL BSR is greater than the latency requirement to which the sidelink logical channel corresponds, and/or the latency requirement is lower than the first threshold.

In the embodiment of this disclosure, in the above condition C, the priority to which the sidelink logical channel corresponds may be a logical channel priority configured by the network device. For example, the network device may transmit configuration information to the terminal equipment, the configuration information including the logical channel priority configured by the network device for the sidelink logical channel, and a mode of transmitting the configuration information and a mode of carrying the logical channel priority in the configuration information are not limited in this disclosure.

In one embodiment, the lower a value of the priority, the higher the priority. Therefore, the terminal equipment may trigger a SR when the value of the priority of the logical channel to which the sidelink logical channel corresponds is lower than a first threshold. In another embodiment, the greater a value of the priority, the higher the priority. Therefore, the terminal equipment may trigger a SR when the value of the priority of the logical channel to which the sidelink logical channel corresponds is higher than a first threshold. The first thresholds to which that "the lower a value of the priority, the higher the priority" and "the greater a value of the priority, the higher the priority" correspond may be identical or different.

In the embodiment of this application, in the above condition C, the above first threshold may be configured by the network device, or may be transmitted by a terminal equipment to another terminal equipment, or may be pre-configured, or may be pre-defined; however, this disclosure is not limited thereto. For example, if the first threshold is configured by the network device, the network device may transmit configuration information to the terminal equipment, the configuration information including the above first threshold configured by it, the configuration information may be included in an RRC message, such as an RRC reconfiguration message or an RRC resume message. For another example, if the first threshold is transmitted by a terminal equipment to another terminal equipment, the configuration information may be included in an RRC message transmitted on a PC5 interface or a sidelink, such as a PC5-RRC message related to access stratum configuration and/or capability information, and a mode of transmitting the configuration information and a mode of carrying the above first threshold in the configuration information are not limited in this disclosure. In addition, when the latency requirement is compared with the first threshold, a unit of the first threshold may be in milliseconds or the number of symbols or the number of slots or the number of subframes or the number of radio frames. And when the priority is compared with the first threshold, a value of the first threshold may be of an integer, which is not limited in this disclosure.

In the embodiment of this disclosure, in the above condition D, that the next SR resource to which the sidelink logical channel corresponds is earlier than the uplink resource carrying the regular SL BSR refers to that a first symbol or slot or subframe or radio frame where the SR resource is located is earlier than a first symbol or slot or subframe or radio frame where the uplink resource carrying the regular SL BSR is located, or a last symbol or slot or subframe or radio frame where the SR resource is located is earlier than a first symbol or slot or subframe or radio frame where the uplink resource carrying the regular SL BSR is located, or a first symbol or slot or subframe or radio frame where the SR resource is located is earlier than a last symbol or slot or subframe or radio frame where the uplink resource carrying the regular SL BSR is located, or a last symbol or slot or subframe or radio frame where the SR resource is located is earlier than a last symbol or slot or subframe or radio frame where the uplink resource carrying the regular SL BSR is located; however, this disclosure is not limited thereto.

In the embodiment of this disclosure, in operation 302, that the scheduling request is transmitted to the network side refers to for a triggered SR, the SR is transmitted to the network side by using an SR configuration. The used SR configuration may be at least one of the following:

- an SR configuration to which a logical channel triggering the regular SL BSR corresponds;
- an SR configuration to which a logical channel of the highest priority in the logical channels triggering the regular SL BSR corresponds;
- an SR configuration to which a logical channel of minimum required latency in the logical channels triggering the regular SL BSR corresponds; and
- an SR configuration to which a logical channel having an earliest SR resource in the logical channels triggering the regular SL BSR corresponds.

In at least one embodiment, the above required latency may be a configured latency-related parameter or a corresponding packet delay budget or other information related to the latency requirement, which is not limited in this disclosure.

In the embodiment of this disclosure, the above conditions A, B, C and D may be used individually or in combination, which shall be described below by way of examples.

In one embodiment, if at least one regular sidelink buffer status report (regular SL BSR) is triggered and condition A is satisfied, that is, the time from the regular SL BSR is triggered to the uplink resource available for carrying the regular SL BSR is greater than the latency requirement (or the latency-related parameter or packet delay budget or other information related to the latency requirement) to which the sidelink logical channel corresponds, the SR is triggered.

Figure 4:
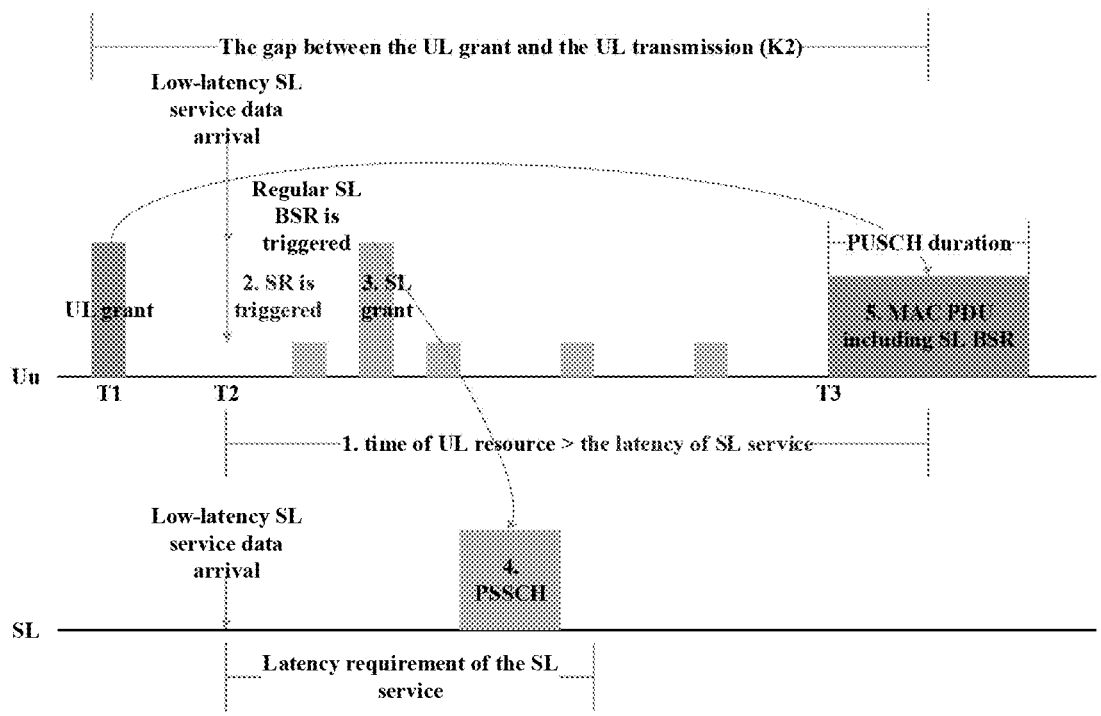
FIG. 4 is a schematic diagram of a scenario of triggering an SR according to the method of the embodiment of this disclosure.

FIG. 4 shows a case where the SR is triggered of this embodiment. As shown in FIG. 4, when the regular SL BSR is triggered, as a time of the UL resource is greater than latency of an SL service, the SR is triggered. Therefore, by triggering the SR, an SL grant may be obtained as early as possible, and SL service transmission may be performed within the latency requirement of the SL service. Whether the transmission of the regular SL BSR is able to satisfy the latency requirement of the service to be transmitted on the sidelink (such as a V2X service) is taken into account in this embodiment, and if the latency requirement is not satisfied, the SR is triggered for the latency-sensitive service, which may alleviate interference on the transmission of the SR while reducing delay of the network side in allocating sidelink resources, and increase of overmuch power consumption in the terminal equipment may be avoided.

Corresponding to this embodiment, the following similar modifications may be made in the standards:

---

1> if the Buffer Status reporting procedure determines that at least one Sidelink BSR has been triggered and not cancelled:
...
   2> if a Regular Sidelink BSR has been triggered:
      ...
      3> [Option 1] if the time from the Sidelink BSR is triggered to the UL-SCH resources available for a new transmission is more than T configured for the logical channel that triggered the Sidelink BSR:
      3> [Option 2] if the time from the Sidelink BSR is triggered to the UL-SCH resources available for a new transmission is more than the packet delay budget corresponding to the logical channel that triggered the Sidelink BSR:
      3> [Option 3] if the time from the Sidelink BSR is triggered to the UL-SCH resources available for a new transmission is more than the latency requirement of the logical channel that triggered the Sidelink BSR:
         4>  trigger a Scheduling Request.

---

In the above description, 3> is newly-added contents, and Option 1, Option 2 and Option 3 are optional.

In another embodiment, if at least one regular sidelink buffer status report (SL BSR) is triggered and condition C is satisfied, that is, the latency requirement (or the latency-related parameter or the packet delay budget or the other information related to the latency requirement) to which the sidelink logical channel corresponds or the value of the priority is lower than the first threshold (the smaller the value of the priority, the higher the priority) or the value of the priority is greater than the first threshold (the larger the value of the priority, the higher the priority), the SR is triggered.

In this embodiment, whether the logical channel triggering the regular SL BSR corresponds to the latency-sensitive service on the sidelink is determined by comparing the latency or priority, and the SR is triggered only for the latency-sensitive service, which is advantageous to reducing delay of allocating the sidelink resources by the network device and simple, modifications to the standard are few and products are easy to be realized. In addition, overmuch SR transmission will not be generated, high interference on the physical uplink control channels (PUCCHs) is reduced, and overmuch power consumption in the terminal equipment is avoided.

Corresponding to this embodiment, the following similar modifications may be made in the standards:

1> if the Buffer Status reporting procedure determines that at least one Sidelink BSR has been triggered and not cancelled:
...
  2> if a Regular Sidelink BSR has been triggered:
...
    3> [Option 1] if T configured for the logical channel that triggered the BSR is lower than a threshold:
    3> [Option 2] if the packet delay budget corresponding to the logical channel that triggered the BSR is lower than a threshold:
    3> [Option 3] if the priority of the logical channel that triggered the BSR is lower than a threshold:
      4> trigger a Scheduling Request.

In the above description, 3> is newly-added contents, Option 1, Option 2 and Option 3 are optional, and corresponding to different options, the above thresholds may be identical or different.

In another embodiment, if at least one regular sidelink buffer status report (SL BSR) is triggered and condition D is satisfied, that is, the next SR resource to which the sidelink logical channel corresponds is earlier than the uplink resource carrying the SL BSR, the SR is triggered.

FIG. 5 shows a case where the SR is triggered of this embodiment. As shown in FIG. 5, when the regular SL BSR is triggered, as the UL resource is later than a next SR resource of an SL LCH of a corresponding SL service, the SR is triggered. Therefore, by triggering the SR, an SL grant may be obtained as early as possible, and SL service transmission may be performed as early as possible. In this embodiment, by comparing the SR resource and the UL resource where the SL BSR is located with respect to temporal precedence, the SR or the SL BSR may be transmitted in the earlier resource, which may speed up allocation of sidelink resources by the network for use in transmission of latency-sensitive services on the sidelink, and is helpful to satisfying latency requirements of the services.

Corresponding to this embodiment, the following similar modifications may be made in the standards:

which condition C is satisfied and the embodiment in which condition A is satisfied for a particular implementation process, which shall not be described herein any further.

In a further embodiment, if at least one regular sidelink buffer status report (SL BSR) is triggered and conditions D and C are satisfied, that is, the latency requirement (or the latency-related parameter or the packet delay budget or the other information related to the latency requirement) to which the sidelink logical channel corresponds or the value of the priority is lower than the first threshold (the smaller the value of the priority, the higher the priority) or the value of the priority is greater than the first threshold (the larger the value of the priority, the higher the priority), and the SR resource to which the sidelink logical channel corresponds is earlier than the uplink resource carrying the regular SL BSR, the SR is triggered. Reference may be made to the above embodiment in which condition D is satisfied and the embodiment in which condition C is satisfied for a particular implementation process, which shall not be described herein any further.

Triggering the SR when condition C and condition A or condition D and condition C are satisfied is helpful to determining whether the logical channel triggering the regular SL BSR corresponds to the latency-sensitive service on the sidelink and transmitting the SR or the SL BSR in earlier 1> if the Buffer Status reporting procedure determines that at least one Sidelink BSR has been triggered and not cancelled:
...
  2> if a Regular Sidelink BSR has been triggered:
...
    3> if the UL-SCH resources available for a new transmission is later than the next available SR resource configured for the logical channel that triggered the BSR:
      4> trigger a Scheduling Request.

In the above description, 3> is newly-added contents.

In another embodiment, if at least one regular sidelink buffer status report (SL BSR) is triggered and conditions C and A are satisfied, that is, the latency requirement (or the latency-related parameter or the packet delay budget or the other information related to the latency requirement) to which the sidelink logical channel corresponds or the value of the priority is lower than the first threshold (the smaller the value of the priority, the higher the priority) or the value of the priority is greater than the first threshold (the larger the value of the priority, the higher the priority), and the time from the regular SL BSR is triggered to the uplink resource available for carrying the regular SL BSR is greater than the latency requirement (or the latency-related parameter or packet delay budget or other information related to the latency requirement) to which the sidelink logical channel triggering the regular SL BSR corresponds, the SR is triggered. Reference may be made to the above embodiment in resources, which may reduce delay in the allocation of sidelink resources and will not generate excessive SR transmission, high interference on the physical uplink control channels (PUCCHs) may be reduced, and overmuch power consumption in the terminal equipment may be avoided.

By triggering the SR by using the method of the embodiment of this disclosure, the SR may be transmitted by using the earlier SR resources, notifying the network side that the corresponding sidelink logical channel has data to be transmitted, in comparison with the traditional SL BSR and SR mechanisms, the network side is made faster in allocating the SL grant for use in the transmission of the latency-sensitive services on the sidelink, which may not only satisfy the latency requirements of the latency-sensitive V2X services, but also not generate excessive SR transmission, thereby reducing high interference on the PUCCHs, and avoiding overmuch power consumption in the terminal equipment.

Embodiment of the Second Aspect

The embodiment of the second aspect of the disclosure provides a configuration method for a sidelink scheduling request, which is applicable to a network device, and is processing at a network side corresponding to the method of the embodiment of the first aspect, with contents identical to those in the embodiment of the first aspect being not going to be described herein any further.

FIG. 6 is a schematic diagram of the method of the second aspect of the embodiments of this disclosure. Referring to FIG. 6, the method includes:

operation 601: a network device transmits first configuration information to a terminal equipment, the first configuration information including a latency-related parameter or logical channel priority to which a sidelink logical channel corresponds, and the terminal equipment triggering an SR when at least one regular sidelink buffer status report (SL BSR) is triggered and at least one of the following conditions A, B, and C is satisfied.

Condition A: a time from the regular SL BSR is triggered to an uplink resource available for carrying the regular SL BSR is greater than a latency-related parameter to which a sidelink logical channel corresponds.

Condition B: a time of the uplink resource available for carrying the regular SL BSR (such as PUSCH duration) is greater than the latency-related parameter to which the sidelink logical channel corresponds.

Condition C: a latency-related parameter or a value of a logical channel priority to which the sidelink logical channel corresponds is lower than a first threshold (the smaller the value of a priority, the higher the priority) or the value of the priority is greater than the first threshold (the larger the value of a priority, the higher the priority).

In the embodiment of this disclosure, the triggering of the at least one regular SL BSR may be that a regular SL BSR has been triggered (or has been triggered and has not been canceled), or may be that more than one regular SL BSRs have been triggered (or have been triggered and have not been cancelled), which are as described in the embodiment of the first aspect, and shall not be described herein any further.

In the embodiment of this disclosure, the above sidelink logical channel may be a sidelink logical channel triggering the above regular SL BSR, and this disclosure is not limited thereto, which are as described in the embodiment of the first aspect, and shall not be described herein any further.

In the embodiment of this disclosure, the network device may also transmit second configuration information to the terminal equipment, the second configuration information including the above first threshold configured by the network device for the terminal equipment.

In the embodiment of this disclosure, modes of transmitting the first configuration information and the second configuration information are not limited, and a mode of carrying the latency-related parameter or the logical channel priority in the first configuration information and a mode of carrying the first threshold in the second configuration information are also not limited. And the first configuration information and the second configuration information may be transmitted simultaneously or separately, and the first configuration information carrying the latency-related parameter and the first configuration information carrying the logical channel priority may be transmitted simultaneously or separately.

In the embodiment of this disclosure, the conditions A, B and C have been described in the embodiment of the first aspect, which shall not be described herein any further.

In the embodiment of this disclosure, in at least one embodiment, the network device may further transmit configuration information carrying the second threshold or the third threshold or the fourth threshold described in the embodiment of the first aspect to the terminal equipment, so that the terminal equipment judges whether that at least one regular sidelink buffer status report is triggered is satisfied. Details are as described in the embodiment of the first aspect, which shall not be described herein any further.

In the embodiment of this disclosure, in at least one embodiment, the network device may also transmit the service quality identifier (such as PQI) to which the logical channel described in the embodiment of the first aspect corresponds to the terminal equipment, so that the terminal equipment judge whether one of the above conditions A-C is satisfied. Details are as described in the embodiment of the first aspect, which shall not be described herein any further.

With the method of the embodiment of this disclosure, not only the latency requirements of the latency-sensitive V2X services may be satisfied, but also no excessive SR transmission may be generated, thereby reducing high interference on the PUCCHs, and avoiding overmuch power consumption in the terminal equipment.

Embodiment of the Third Aspect

The embodiment of the third aspect of the disclosure provides an apparatus for triggering a sidelink scheduling request, configured in a terminal equipment. As principles of the apparatus for solving problems are similar to that of the method of the embodiment of the first aspect, reference may be made to the implementations of the method of the embodiment of the first aspect for implementations of this apparatus, with identical parts being not going to be described herein any further.

Figure 7:
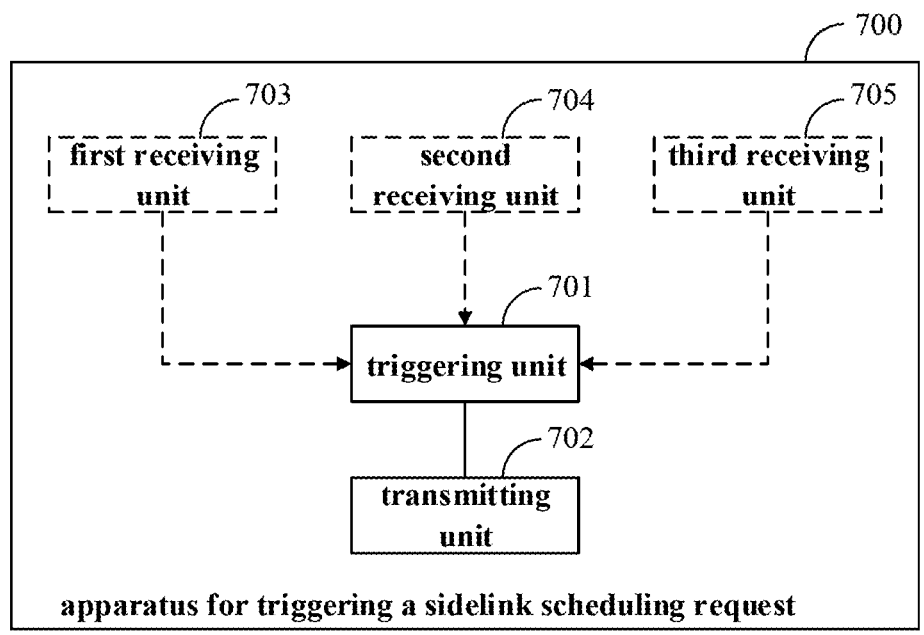
FIG. 7 is a schematic diagram of the apparatus of the third aspect of the embodiments of this disclosure.

FIG. 7 is a schematic diagram of the apparatus 700 for triggering a sidelink scheduling request of the third aspect of the embodiments of this disclosure. As shown in FIG. 7, the apparatus 700 includes: a triggering unit 701 and a transmitting unit 702. If at least one regular sidelink buffer status report (SL BSR) is triggered, the triggering unit 701 triggers a scheduling request (SR) when at least one of conditions A, B, C and D is satisfied, and the transmitting unit 702 transmits the scheduling request to a network side.

Condition A: a time from the regular SL BSR is triggered to an uplink resource available for carrying the regular SL BSR is greater than a latency requirement to which a sidelink logical channel corresponds;

Condition B: a time of the uplink resource available for carrying the regular SL BSR (such as PUSCH duration) is greater than the latency requirement to which the sidelink logical channel corresponds;

Condition C: a latency requirement or value of a priority to which the sidelink logical channel corresponds is lower than a first threshold (the smaller the value of a priority, the higher the priority) or the value of the priority is greater than the first threshold (the larger the value of a priority, the higher the priority); and Condition D: a next SR resource to which the sidelink logical channel corresponds is earlier than an uplink resource carrying the regular SL BSR.

In at least one embodiment, the triggering of the at least one regular SL BSR refers to that a regular SL BSR has been triggered (or has been triggered and has not been canceled), and for the triggered regular sidelink buffer status report, when at least one of the conditions is satisfied, the triggering unit 701 triggers the SR.

In at least one embodiment, the triggering of the at least one regular SL BSR refers to that more than one regular SL BSRs have been triggered (or have been triggered and have not been cancelled), and for a triggered regular sidelink buffer status report, when at least one of the conditions is satisfied, the triggering unit 701 triggers the SR.

In at least one embodiment, the triggering of the at least one regular SL BSR refers to that more than one regular sidelink buffer status reports have been triggered or have been triggered and have not been cancelled, for a logical channel of a highest priority, or a logical channel of minimum required latency, or a logical channel having a value of a priority less than a second threshold, or a logical channel having a latency requirement less than a third threshold, in the logical channels triggering the regular sidelink buffer status reports, when at least one of the conditions is satisfied, the triggering unit 701 triggers the SR.

In at least one embodiment, the sidelink logical channel is a sidelink logical channel triggering the regular SL BSR; however, this disclosure is not limited thereto, which are as described in the embodiment of the first aspect, and shall not be described herein any further.

In at least one embodiment, in the above condition A, the time from the regular SL BSR is triggered to an uplink resource available for carrying the regular SL BSR refers to a time from a moment when the regular SL BSR is triggered to a starting moment of the uplink resource available for carrying the regular SL BSR, or a time from a moment when the regular SL BSR is triggered to an ending moment of the uplink resource available for carrying the regular SL BSR, i.e. a time including a UL resource, such as a PUSCH duration.

In at least one embodiment, in the above conditions A-C, the latency requirement to which the sidelink logical channel corresponds is at least one piece of the following information related to latency requirement: a latency-related parameter configured for the sidelink logical channel; a packet delay budget to which the sidelink logical channel corresponds; and other information related to the latency requirement.

In at least one embodiment, the above latency-related parameter may be configured by the network device via configuration information, and as shown in FIG. 7, the apparatus 700 further includes:

a first receiving unit 703 configured to receive first configuration information transmitted by the network device, the first configuration information including the latency-related parameter to which the sidelink logical channel corresponds.

In at least one embodiment, the packet latency budget is a packet latency budget to which a service quality identifier (such as PQI) corresponds, the sidelink logical channel corresponding to the service quality identifier. In at least one embodiment, the information related to a latency requirement is a latency requirement to which a default priority level corresponds, the service quality identifier corresponding to the default priority level, the sidelink logical channel corresponding to the service quality identifier. And the service quality identifier (such as a PQI) to which the sidelink logical channel corresponds may be: a service quality identifier (such as a PQI) of a sidelink traffic flow (QoS flow) corresponding to a sidelink radio bearer to which the sidelink logical channel corresponds, or a service quality identifier (such as a PQI) to which a packet carried in the sidelink logical channel corresponds, or a service quality identifier (such as a PQI) to which the logical channel configured by the network device or preconfigured logical channel corresponds.

In at least one embodiment, in the above condition C, the priority to which the above sidelink logical channel corresponds is a logical channel priority configured by the network device, the smaller a value of the priority, the higher the priority, or the larger a value of the priority, the higher the priority, which are as described in the embodiment of the first aspect, and shall not be described herein any further. The network device may configure the logical channel priority via configuration information, and as shown in FIG. 7, the apparatus 700 further includes:

a second receiving unit 704 configured to receive second configuration information transmitted by the network device, the second configuration information including a logical channel priority to which the sidelink logical channel corresponds.

In at least one embodiment, in the above condition C, the first threshold is configured by the network device, or is pre-configured or predefined. The network device may configure the threshold via configuration information, and as shown in FIG. 7, the apparatus 700 further includes:

a third receiving unit 705 configured to receive third configuration information transmitted by the network device, the third configuration information including the first threshold configured by the network device for the terminal equipment.

In at least one embodiment, in the above condition D, that a next SR resource to which the sidelink logical channel corresponds is earlier than an uplink resource carrying the regular SL BSR refers to:

that a first symbol or slot or subframe or radio frame where the SR resource is located is earlier than a first symbol or slot or subframe or radio frame where the uplink resource carrying the regular SL BSR is located; or that a last symbol or slot or subframe or radio frame where the SR resource is located is earlier than the first symbol or slot or subframe or radio frame where the uplink resource carrying the regular SL BSR is located; or that the first symbol or slot or subframe or radio frame where the SR resource is located is earlier than the last symbol or slot or subframe or radio frame where the uplink resource carrying the regular SL BSR is located; or the last symbol or slot or subframe or radio frame where the SR resource is located is earlier than the last symbol or slot or subframe or radio frame where the uplink resource carrying the regular SL BSR is located.

In the embodiment of this disclosure, the first receiving unit 703 or the second receiving unit 704 or the third receiving unit 705 may further receive configuration information carrying the second threshold or the third threshold or the fourth threshold and/or configuration information carrying the PQI to which the logical channel corresponds, and reference may be made to the embodiment of the first aspect, which shall not be described herein any further.

In the embodiment of this disclosure, the transmitting unit 702 may transmit the triggered SR by using a SR configuration, the SR configuration being one of the following:

a SR configuration to which a logical channel triggering the regular SL BSR corresponds;

a SR configuration to which a logical channel of the highest priority in the logical channels triggering the regular SL BSR corresponds;

a SR configuration to which a logical channel of minimum required latency in the logical channels triggering the regular SL BSR corresponds; and a SR configuration to which a logical channel having an earliest SR resource in the logical channels triggering the regular SL BSR corresponds.

With the apparatus of the embodiment of this disclosure, conditions for triggering the SR are increased, so that the SR is triggered, thereby facilitating the network side to schedule SL resources as early as possible according to the received SR, and reducing transmission latency for latency-sensitive SL data.

Embodiment of the Fourth Aspect

The embodiment of the fourth aspect of the disclosure provides a configuration apparatus for a sidelink scheduling request, configured in a network device. As principles of the apparatus for solving problems are similar to that of the method of the embodiment of the second aspect, reference may be made to the implementations of the method of the embodiment of the second aspect for implementations of this apparatus, with identical parts being not going to be described herein any further.

Figure 8:
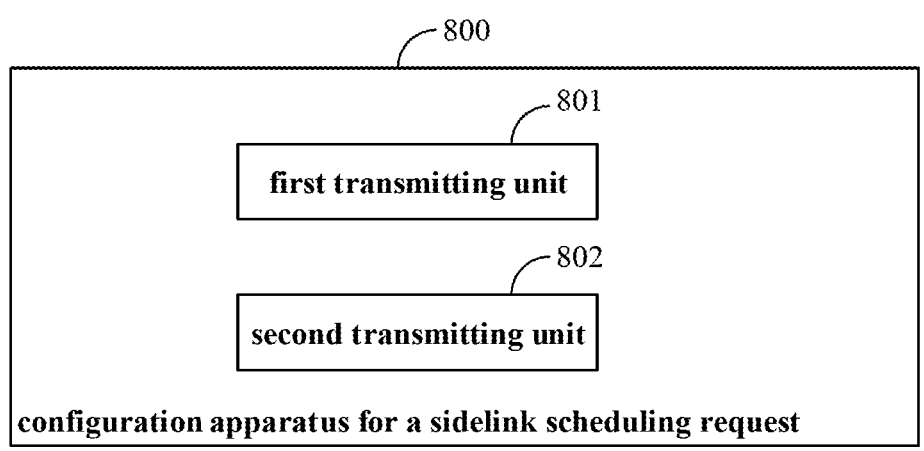
FIG. 8 is a schematic diagram of the apparatus of the fourth aspect of the embodiments of this disclosure.

FIG. 8 is a schematic diagram of the configuration apparatus 800 for a sidelink scheduling request of this embodiment. As shown in FIG. 8, the apparatus 800 includes: a first transmitting unit 801 configured to transmit first configuration information to a terminal equipment, the first configuration information including a latency-related parameter or logical channel priority to which a sidelink logical channel corresponds, and the terminal equipment triggering an SR when at least one regular sidelink buffer status report (SL BSR) is triggered and at least one of the following conditions A, B and C is satisfied.

Condition A: a time from the regular SL BSR is triggered to an uplink resource available for carrying the regular SL BSR is greater than a latency-related parameter to which a sidelink logical channel corresponds.

Condition B: a time of the uplink resource available for carrying the regular SL BSR (such as PUSCH duration) is greater than the latency-related parameter to which the sidelink logical channel corresponds.

Condition C: a latency-related parameter or a value of a logical channel priority to which the sidelink logical channel corresponds is lower than a first threshold (the smaller the value of a priority, the higher the priority) or the value of the priority is greater than the first threshold (the larger the value of a priority, the higher the priority).

In the embodiment of this disclosure, that at least one regular sidelink buffer status report is triggered may be that a regular SL BSR has been triggered (or has been triggered and has not been cancelled), or may be that more than one regular SL BSRs have been triggered (or have been triggered and have not been cancelled), which are as described in the embodiment of the first aspect, and shall not be described herein any further.

In the embodiment of this disclosure, the sidelink logical channel is a sidelink logical channel triggering the SL BSR; however, this disclosure is not limited thereto, which are as described in the embodiment of the first aspect, and shall not be described herein any further.

In the embodiment of this disclosure, the time from the regular SL BSR is triggered to an uplink resource available for carrying the regular SL BSR refers to:

a time from a moment when the regular SL BSR is triggered to a starting moment of the uplink resource available for carrying the regular SL BSR; or a time from a moment when the regular SL BSR is triggered to an ending moment of the uplink resource available for carrying the regular SL BSR.

In the embodiment of this disclosure, as shown in FIG. 8, the apparatus 800 may further include:

a second transmitting unit 802 configured to transmit second configuration information to the terminal equipment, the second configuration information including the first threshold configured by the network device for the terminal equipment.

In the embodiment of this disclosure, the first transmitting unit 801 or the second transmitting unit 802 may further transmit configuration information carrying the second threshold or the third threshold or the fourth threshold described in the embodiment of the first aspect to the terminal equipment, or may transmit a service quality identifier (such as a PQI) to which the logical channel described in the embodiment of the first aspect corresponds to the terminal equipment. Details are as described in the embodiment of the first aspect, which shall not be described herein any further.

In the embodiment of this disclosure, the above conditions A-C as well as the first configuration information and the second configuration information have been described in the embodiment of the first aspect or the embodiment of the second aspect, the contents of which being incorporated herein, and being not going to be described herein any further.

With the apparatus of the embodiment of this disclosure, not only the latency requirements of the latency-sensitive V2X services may be satisfied, but also excessive SR transmission will not be generated, thereby reducing high interference on the PUCCHs, and avoiding overmuch power consumption in the terminal equipment.

Embodiment of the Fifth Aspect

The embodiment of the fifth aspect of the disclosure provides a terminal equipment, including the apparatus described in the embodiment of the third aspect.

Figure 9:
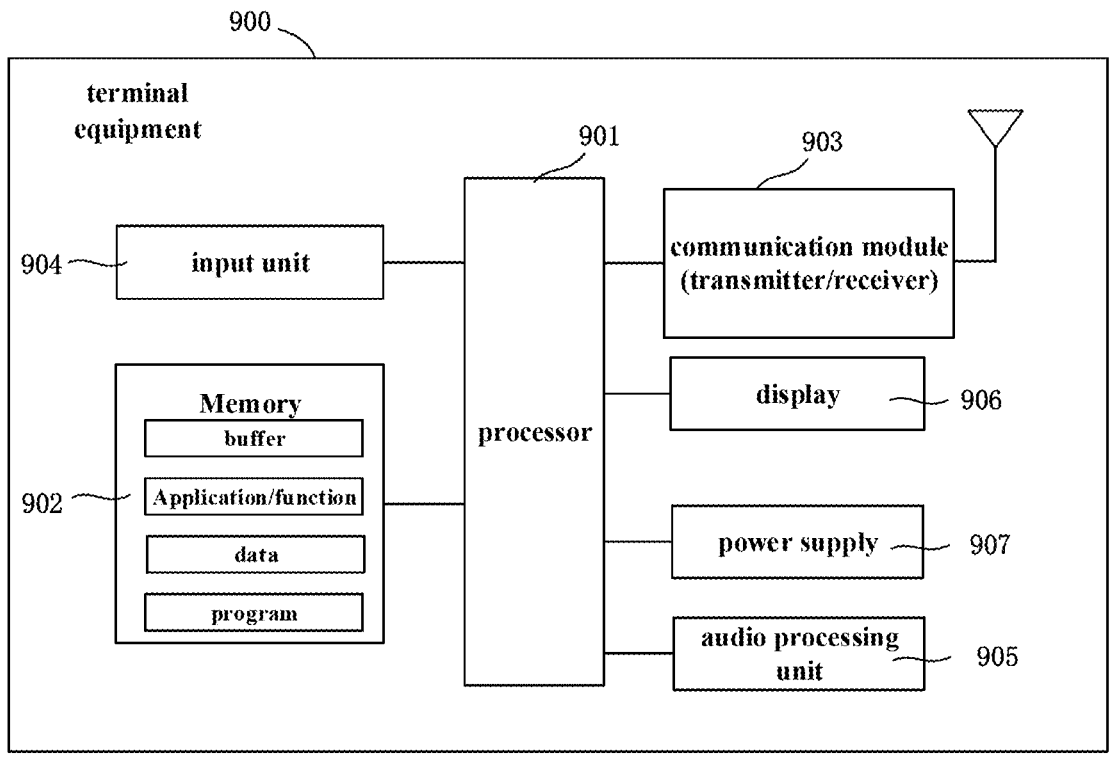
FIG. 9 is a schematic diagram of the terminal equipment of the fifth aspect of the embodiments of this disclosure.

FIG. 9 is a schematic diagram of the terminal equipment of the embodiment of the fifth aspect. As shown in FIG. 9, the terminal equipment 900 may include a central processing unit 901 and a memory 902, the memory 902 being coupled to the central processing unit 901. It should be noted that this figure is illustrative only, and other types of structures may also be used, so as to supplement or replace this structure and achieve a telecommunications function or other functions.

In one implementation, the functions of the apparatus described in the embodiment of the third aspect may be integrated into the central processing unit 901, and the central processing unit 901 executes functions of the apparatus described in the embodiment of the third aspect. The functions of the apparatus described in the embodiment of the third aspect are incorporated herein, and shall not be described herein any further.

In another embodiment, the apparatus described in the embodiment of the third aspect and the central processing unit 901 may be configured separately; for example, the apparatus described in the embodiment of the third aspect may be configured as a chip connected to the central processing unit 901, and the functions of the apparatus described in the embodiment of the third aspect are executed under control of the central processing unit 901.

As shown in FIG. 9, in one or more embodiments, the terminal equipment 900 may further include a communication module 903, an input unit 904, an audio processing unit 905, a display 906 and a power supply 907. It should be noted that the terminal equipment 900 does not necessarily include all the parts shown in FIG. 9. Furthermore, the terminal equipment 900 may include parts not shown in FIG. 9, and the related art may be referred to.

As shown in FIG. 9, the central processing unit 901 is sometimes referred to as a controller or an operational control, which may include a microprocessor or other processor devices and/or logic devices. The central processing unit 901 receives input and controls operations of components of the terminal equipment 900.

The memory 902 may be, for example, one or more of a buffer memory, a flash memory, a hard drive, a mobile medium, a volatile memory, a nonvolatile memory, or other suitable devices, which may store various data, etc., and furthermore, store programs executing related information. And the central processing unit 901 may execute programs stored in the memory 902, so as to realize information storage or processing, etc. Functions of other parts are similar to those of the related art, which shall not be described herein any further. The parts of the terminal equipment 900 may be realized by specific hardware, firmware, software, or any combination thereof, without departing from the scope of this disclosure.

With the terminal equipment of this embodiment, the method of the embodiment of the first aspect is used, conditions for triggering the SR are increased, so that the SR is triggered, thereby facilitating the network side to schedule SL resources as early as possible according to the received SR, and reducing transmission latency for latency-sensitive SL data.

Embodiment of the Sixth Aspect

The embodiment of the sixth aspect of the disclosure provides a network device, including the apparatus described in the embodiment of the fourth aspect.

Figure 10:
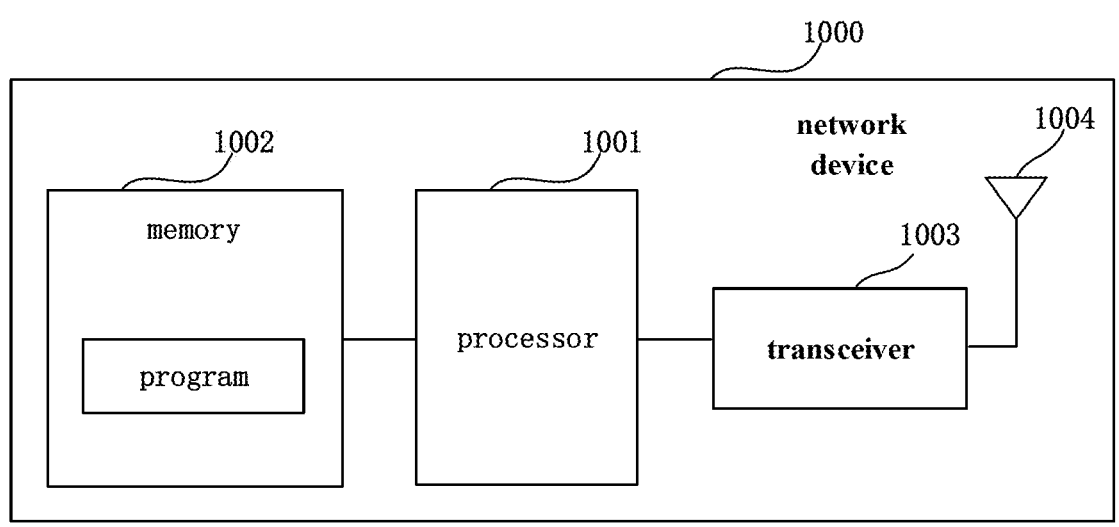
FIG. 10 is a schematic diagram of the network device of the sixth aspect of the embodiments of this disclosure.

FIG. 10 is a schematic diagram of the network device of the embodiment of the sixth aspect of the disclosure. As shown in FIG. 10, the network device 1000 includes a central processing unit (CPU) 1001 and a memory 1002, the memory 1002 being coupled to the central processing unit 1001. The memory 1002 may store various data, and furthermore, it may store a program for data processing, and execute the program under control of the central processing unit 1001, so as to receive various information transmitted by a terminal equipment, and transmit various information to the terminal equipment.

In one embodiment, the functions of the apparatus described in the embodiment of the fourth aspect may be integrated into the central processing unit 1001, and the central processing unit 1001 executes functions of the apparatus described in the embodiment of the fourth aspect. The functions of the apparatus described in the embodiment of the fourth aspect are incorporated herein, and shall not be described herein any further.

In another embodiment, the apparatus described in the embodiment of the fourth aspect and the central processing unit 1001 may be configured separately; for example, the apparatus described in the embodiment of the fourth aspect may be configured as a chip connected to the central processing unit 1001, and the functions of the apparatus described in the embodiment of the fourth aspect are executed under control of the central processing unit 1001.

Furthermore, as shown in FIG. 10, the network device 1000 may include a transceiver 1003, and an antenna 1004, etc. Functions of the above components are similar to those in the related art, and shall not be described herein any further. It should be noted that the network device 1000 does not necessarily include all the parts shown in FIG. 10. Furthermore, the network device 1000 may include parts not shown in FIG. 10, and the related art may be referred to.

With the network device of this embodiment, the method of the embodiment of the second aspect is used, not only the latency requirements of the latency-sensitive V2X services may be satisfied, but also no excessive SR transmission may be generated, thereby reducing high interference on the PUCCHs, and avoiding overmuch power consumption in the terminal equipment.

Embodiment of the Seventh Aspect

The embodiment of the seventh aspect of the disclosure provides a communication system, including a network device and a terminal equipment. The network device is, for example, the network device 1000 described in the embodiment of the sixth aspect, and the terminal equipment is, for example, the terminal equipment 900 described in the embodiment of the fifth aspect.

In this embodiment, the terminal equipment is, for example, a UE served by a gNB, and may include conventional compositions and functions of a terminal equipment in addition to the functions of the apparatus described in the embodiment of the third aspect, which are as described in the embodiment of the fifth aspect, and shall not be described herein any further.

In this embodiment, the network device may be, for example, a gNB in NR, and may include conventional compositions and functions of a network device in addition to the functions of the apparatus described in the embodiment of the fourth aspect, which are as described in the embodiment of the sixth aspect, and shall not be described herein any further.

With the communication system of this embodiment, conditions for triggering the SR are increased, so that the SR is triggered, thereby facilitating the network side to schedule SL resources as early as possible according to the received SR, and reducing transmission latency for latency-sensitive SL data.

An embodiment of this disclosure provides a computer readable program, which, when executed in a terminal equipment, will cause a computer to carry out the method described in the embodiment of the first aspect in the terminal equipment.

An embodiment of this disclosure provides a storage medium storing a computer readable program, which will cause a computer to carry out the method described in the embodiment of the first aspect in a terminal equipment.

An embodiment of this disclosure provides a computer readable program, which, when executed in a network device, will cause a computer to carry out the method described in the embodiment of the second aspect in the network device.

An embodiment of this disclosure provides a storage medium storing a computer readable program, which will cause a computer to carry out the method described in the embodiment of the second aspect in a network device.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in FIGS. 7 and 8 may either correspond to software modules of procedures of a computer program, or correspond to hardware modules. Such software modules may respectively correspond to the steps shown in FIGS. 3 and 6. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIGS. 7 and 8 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIGS. 7 and 8 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of this disclosure. Various variants and modifications may be made by those skilled in the art according to the principle of this disclosure, and such variants and modifications fall within the scope of this disclosure.

As to implementations including the above embodiments, following supplements are further disclosed.

1. An apparatus for triggering a sidelink scheduling request, configured in a terminal equipment, wherein the apparatus includes:

a triggering unit configured to, if at least one regular sidelink buffer status report (SL BSR) is triggered, trigger a scheduling request (SR) when at least one of the following conditions is satisfied that:

a time from the regular SL BSR is triggered to an uplink resource available for carrying the regular SL BSR is greater than a latency requirement to which a sidelink logical channel corresponds;

a time of the uplink resource available for carrying the regular SL BSR is greater than the latency requirement to which the sidelink logical channel corresponds;

a latency requirement or value of a priority to which the sidelink logical channel corresponds is lower than a first threshold or the value of the priority is greater than the first threshold; and a next SR resource to which the sidelink logical channel corresponds is earlier than an uplink resource carrying the regular SL BSR; and a transmitting unit configured to transmit the scheduling request to a network side.

2. The apparatus according to supplement 1, wherein that at least one regular sidelink buffer status report is triggered refers to that:

if the regular sidelink buffer status report has been triggered or has been triggered and has not been canceled, for the triggered regular sidelink buffer status report, when at least one of the above conditions is satisfied, the triggering unit triggers the SR; or if more than one regular sidelink buffer status reports have been triggered or have been triggered and have not been cancelled, for a triggered regular sidelink buffer status report, when at least one of the above conditions is satisfied, the triggering unit triggers the SR; or if more than one regular sidelink buffer status reports have been triggered or have been triggered and have not been cancelled, for a logical channel of a highest priority, or a logical channel of minimum required latency, or a logical channel having a value of a priority less than a second threshold, or a logical channel having a latency requirement less than a third threshold, in logical channels triggering the regular sidelink buffer status reports, when at least one of the above conditions is satisfied, the triggering unit triggers the SR.

3. The apparatus according to supplement 1, wherein the sidelink logical channel is a sidelink logical channel triggering the regular SL BSR.

4. The apparatus according to any one of supplements 1-3, wherein the time from the regular SL BSR is triggered to an uplink resource available for carrying the regular SL BSR refers to:

a time from a moment when the regular SL BSR is triggered to a starting moment of the uplink resource available for carrying the regular SL BSR; or a time from a moment when the regular SL BSR is triggered to an ending moment of the uplink resource available for carrying the regular SL BSR.

5. The apparatus according to any one of supplements 1-3, wherein the latency requirement to which the sidelink logical channel corresponds is at least one piece of the following information related to a latency requirement:

a latency-related parameter configured for the sidelink logical channel;

a packet delay budget to which the sidelink logical channel corresponds; and other information related to a latency requirement.

6. The apparatus according to supplement 5, wherein the apparatus further includes:
a first receiving unit configured to receive first configuration information transmitted by a network device or another terminal equipment, the first configuration information including the latency-related parameter to which the sidelink logical channel corresponds.

7. The apparatus according to supplement 5, wherein the packet latency budget is a packet latency budget to which a service quality identifier (PQI) corresponds, the sidelink logical channel corresponding to the service quality identifier (PQI), and the information related to a latency requirement is a latency requirement to which a default priority level corresponds, the service quality identifier (PQI) corresponding to the default priority level, the sidelink logical channel corresponding to the service quality identifier (PQI).

8. The apparatus according to supplement 7, wherein the service quality identifier (PQI) to which the sidelink logical channel corresponds is:
a service quality identifier (PQI) of a sidelink traffic flow (QoS flow) corresponding to a sidelink radio bearer to which the sidelink logical channel corresponds; or
a service quality identifier (PQI) to which a packet carried in the sidelink logical channel corresponds; or
a service quality identifier (PQI) to which the logical channel configured by the network device or preconfigured logical channel corresponds.

9. The apparatus according to any one of supplements 1-3, wherein the priority to which the sidelink logical channel corresponds is a logical channel priority configured by the network device, and the smaller a value of the priority is, the higher the priority is, or the larger a value of the priority is, the higher the priority is.

10. The apparatus according to supplement 9, wherein the apparatus further includes:
a second receiving unit configured to receive second configuration information transmitted by the network device, the second configuration information including a logical channel priority to which the sidelink logical channel corresponds.

11. The apparatus according to any one of supplements 1-3, wherein the first threshold is configured by the network device, or is pre-configured or predefined.

12. The apparatus according to supplement 11, wherein the apparatus further includes:
a third receiving unit configured to receive third configuration information transmitted by the network device or another terminal equipment, the third configuration information including the first threshold configured by the network device or the other terminal equipment for the terminal equipment.

13. The apparatus according to any one of supplements 1-3, wherein that a next SR resource to which the sidelink logical channel corresponds is earlier than an uplink resource carrying the regular SL BSR refers to one of the following:
that a first symbol or slot or subframe or radio frame where the SR resource is located is earlier than a first symbol or slot or subframe or radio frame where the uplink resource carrying the regular SL BSR is located;
that a last symbol or slot or subframe or radio frame where the SR resource is located is earlier than the first symbol or slot or subframe or radio frame where the uplink resource carrying the regular SL BSR is located;
that the first symbol or slot or subframe or radio frame where the SR resource is located is earlier than the last symbol or slot or subframe or radio frame where the uplink resource carrying the regular SL BSR is located; and
the last symbol or slot or subframe or radio frame where the SR resource is located is earlier than the last symbol or slot or subframe or radio frame where the uplink resource carrying the regular SL BSR is located.

14. The apparatus according to any one of supplements 1-3, wherein the transmitting unit transmits the triggered SR by using an SR configuration, the SR configuration being one of the following:
an SR configuration to which a logical channel triggering the regular SL BSR corresponds;
an SR configuration to which a logical channel of the highest priority in the logical channels triggering the regular SL BSR corresponds;
an SR configuration to which a logical channel of minimum required latency in the logical channels triggering the regular SL BSR corresponds; and
an SR configuration to which a logical channel having an earliest SR resource in the logical channels triggering the regular SL BSR corresponds.

15. A configuration apparatus for a sidelink scheduling request, configured in a network device, wherein the apparatus includes:
a first transmitting unit configured to transmit first configuration information to a terminal equipment, the first configuration information including a latency-related parameter or logical channel priority to which a sidelink logical channel corresponds, and the terminal equipment triggering an SR when at least one regular sidelink buffer status report (SL BSR) is triggered and at least one of the following conditions is satisfied that:
a time from the regular SL BSR is triggered to an uplink resource available for carrying the regular SL BSR is greater than a latency-related parameter to which a sidelink logical channel corresponds;
a time of the uplink resource available for carrying the regular SL BSR is greater than the latency-related parameter to which the sidelink logical channel corresponds; and
a latency-related parameter or a value of a logical channel priority to which the sidelink logical channel corresponds is lower than a first threshold or the value of the priority is greater than the first threshold.

16. The apparatus according to supplement 15, wherein that at least one regular sidelink buffer status report is triggered refers to that:
a regular sidelink buffer status report has been triggered or has been triggered and has not been cancelled, or
more than one regular sidelink buffer status reports have been triggered or have been triggered and have not been cancelled.

17. The apparatus according to supplement 15, wherein the sidelink logical channel is a sidelink logical channel triggering the regular SL BSR.

18. The apparatus according to any one of supplements 15-17, wherein the time from the regular SL BSR is triggered to an uplink resource available for carrying the regular SL BSR refers to:
a time from a moment when the regular SL BSR is triggered to a starting moment of the uplink resource available for carrying the regular SL BSR; or
a time from a moment when the regular SL BSR is triggered to an ending moment of the uplink resource available for carrying the regular SL BSR.

19. The apparatus according to any one of supplements 15-17, wherein the apparatus further includes:
a second transmitting unit configured to transmit second configuration information to the terminal equipment, the second configuration information including the first threshold configured by the network device for the terminal equipment.

20. A communication system, including a network device and a terminal equipment, wherein the terminal equipment includes the apparatus as described in any one of supplements 1-14, and/or, the network device includes the apparatus as described in any one of supplements 15-19.

What is claimed is:

1. An apparatus for triggering a sidelink scheduling request, configured in a terminal equipment, the apparatus comprising:
triggering circuitry configured to, if at least one regular sidelink buffer status report is triggered, trigger a scheduling request when a Physical Uplink Shared Channel (PUSCH) duration of an uplink resource available for carrying the regular sidelink buffer status report is greater than a latency related parameter configured for a sidelink logical channel that triggers the sidelink buffer status report; and
transmitting circuitry configured to transmit the scheduling request to a network side,
wherein the apparatus further comprises: first receiving circuitry configured to receive first configuration information transmitted by a network device, the first configuration information comprising the latency-related parameter configured for the sidelink logical channel.

2. The apparatus according to claim 1, wherein that at least one regular sidelink buffer status report is triggered refers to that:
if the regular sidelink buffer status report has been triggered or has been triggered and has not been canceled, for the triggered regular sidelink buffer status report, when at least one of the above conditions is satisfied, the triggering circuitry triggers the scheduling request; or
if more than one regular sidelink buffer status reports have been triggered or have been triggered and have not been cancelled, for a triggered regular sidelink buffer status report, when at least one of the above conditions is satisfied, the triggering circuitry triggers the scheduling request.

3. The apparatus according to claim 1, wherein the transmitting circuitry transmits the triggered scheduling request by using a scheduling request configuration, the scheduling request configuration being one of the following:
a scheduling request configuration to which a logical channel triggering the regular sidelink buffer status report corresponds;
a scheduling request configuration to which a logical channel of the highest priority in the logical channels triggering the regular sidelink buffer status report corresponds;
a scheduling request configuration to which a logical channel of minimum required latency in the logical channels triggering the regular sidelink buffer status report corresponds; and
a scheduling request configuration to which a logical channel having an earliest scheduling request resource in the logical channels triggering the regular sidelink buffer status report corresponds.

4. A configuration apparatus for a sidelink scheduling request, configured in a network device, the configuration apparatus comprising:
first transmitting circuitry configured to transmit first configuration information to a terminal equipment, the first configuration information including a latency-related parameter configured for a sidelink logical channel that triggers at least one regular sidelink buffer status report, and the terminal equipment triggering a scheduling request when a Physical Uplink Shared Channel (PUSCH) duration of the uplink resource available for carrying the regular sidelink buffer status report is greater than the latency-related parameter configured for the sidelink logical channel that triggers the sidelink buffer status report.

5. The apparatus according to claim 4, wherein that at least one regular sidelink buffer status report is triggered refers to that:
a regular sidelink buffer status report has been triggered or has been triggered and has not been cancelled, or
more than one regular sidelink buffer status reports have been triggered or have been triggered and have not been cancelled.

6. A communication system, comprising a network device that comprises the apparatus of claim 4, and a terminal equipment, wherein the terminal equipment comprises:
triggering circuitry configured to, if at least one regular sidelink buffer status report is triggered, trigger a scheduling request when
a Physical Uplink Shared Channel (PUSCH) duration of the uplink resource available for carrying the regular sidelink buffer status report is greater than a latency-related parameter configured for a sidelink logical channel that triggers the sidelink buffer status report; and
a transmitter configured to transmit the scheduling request to a network side,
wherein the apparatus further comprises: a receiver configured to receive configuration information transmitted by the network device, the configuration information comprising the latency-related parameter configured for the sidelink logical channel.

* * * * *